United States Patent
Greenthal

(10) Patent No.: US 10,025,165 B2
(45) Date of Patent: Jul. 17, 2018

(54) CAMERA MOUNT

(71) Applicant: Freedom360 LLC, Astoria, NY (US)

(72) Inventor: Steven M. Greenthal, Buena Park, CA (US)

(73) Assignee: Freedom360 LLC, Astoria, NY (US)

( * ) Notice: Subject to any disclaimer, the term of this patent is extended or adjusted under 35 U.S.C. 154(b) by 0 days.

(21) Appl. No.: 15/251,545

(22) Filed: Aug. 30, 2016

(65) Prior Publication Data

US 2018/0059515 A1  Mar. 1, 2018

(51) Int. Cl.
| | | |
|---|---|---|
| G03B 17/00 | (2006.01) | |
| G03B 17/56 | (2006.01) | |
| H04N 5/247 | (2006.01) | |
| F16M 11/24 | (2006.01) | |
| F16M 11/16 | (2006.01) | |
| F16M 11/08 | (2006.01) | |
| F16M 13/00 | (2006.01) | |
| F16M 11/04 | (2006.01) | |

(52) U.S. Cl.
CPC ......... *G03B 17/561* (2013.01); *F16M 11/041* (2013.01); *F16M 11/08* (2013.01); *F16M 11/16* (2013.01); *F16M 11/242* (2013.01); *F16M 13/00* (2013.01); *H04N 5/247* (2013.01)

(58) Field of Classification Search
CPC ........ G03B 17/56; F16M 11/00; F16M 11/02; F16M 11/04; F16M 11/06; F16M 11/08; F16M 11/16; F16M 13/00; H04N 5/247
USPC ....... 396/428, 419; 348/373; 248/688, 187.1
See application file for complete search history.

(56) References Cited

U.S. PATENT DOCUMENTS

| | | | |
|---|---|---|---|
| 3,448,954 A | | 6/1969 | Kurlandsky |
| 3,672,053 A | * | 6/1972 | Wiss ........................ B26B 13/28 30/267 |
| 3,893,145 A | * | 7/1975 | King ...................... G03B 15/05 362/8 |
| 4,625,507 A | | 12/1986 | Moritz et al. |
| 5,174,104 A | * | 12/1992 | Wehler .................... F16G 13/16 248/49 |
| 7,292,257 B2 | | 11/2007 | Kang et al. |
| 8,421,846 B2 | | 4/2013 | Nelson et al. |
| 8,849,013 B2 | | 9/2014 | Xu et al. |
| 8,896,671 B2 | | 11/2014 | Jayaram et al. |
| 8,934,014 B2 | | 1/2015 | Lee et al. |

(Continued)

*Primary Examiner* — Clayton E LaBelle
*Assistant Examiner* — Fang-Chi Chang
(74) *Attorney, Agent, or Firm* — Alleman Hall Creasman & Tuttle LLP

(57) ABSTRACT

A camera mount, assembly, and method for supporting a number of cameras side-by-side along a linear or curvilinear path. The camera mount includes a rigid body having a tab and a coupling flange extending from opposite ends thereof. Tabs and flanges of adjacent mounts are overlapped and coupled via a fastener installed therethrough. A spring washer is installed on the fastener to preload the joint against relative movements, but the mounts are pivotable by hand about an axis formed by the fastener. Angular orientation between adjacent mounts can be defined using a gauge inserted between opposing faces of the mounts. Cameras are disposable on each mount and retained thereon by an elastic band extending over the camera and retained on catches provided on each side of the mount. The assembly of camera mounts is substantially rigid thus requiring few support devices.

17 Claims, 8 Drawing Sheets

(56) References Cited

U.S. PATENT DOCUMENTS

| | | | |
|---|---|---|---|
| 8,964,067 B2 | 2/2015 | Conley | |
| 9,123,172 B2 | 9/2015 | Sebring et al. | |
| 2011/0129210 A1* | 6/2011 | McGucken | F16M 13/02 |
| | | | 396/422 |
| 2014/0217862 A1* | 8/2014 | Rayner | G06F 1/1601 |
| | | | 312/223.1 |
| 2015/0035951 A1 | 2/2015 | Jayaram et al. | |
| 2015/0249730 A1* | 9/2015 | Larsen | G03B 17/561 |
| | | | 29/428 |
| 2015/0341617 A1 | 11/2015 | Cole et al. | |
| 2015/0348580 A1 | 12/2015 | van Hoff et al. | |
| 2016/0037026 A1 | 2/2016 | Kintner | |
| 2016/0041454 A1 | 2/2016 | McElderry | |
| 2016/0100154 A1 | 4/2016 | Ghyme | |

* cited by examiner

CAMERA MOUNT

BACKGROUND

Bullet time is a common name given to a process used in motion pictures that provides a change in viewpoint relative to the subject being viewed and may provide slow or stop motion effects during the changing of the view point. For example, the viewpoint may be revolved around a subject while the subject is stopped or slowed in time to give a unique three-dimensional slow motion effect to the motion picture.

Capturing bullet time video or images for use in creating bullet time video typically comprises the use of a plurality of still-frame or video cameras arranged around the subject to capture images or video of the subject simultaneously or sequentially from a plurality of viewpoints. The still frames or portions of the video captured are then combined in a sequence that provides the desired visual effect.

To appropriately position the cameras to capture content for bullet time video, complex camera rigs or structures must typically be custom built. These rigs may be built from sections of pipe or tubing or similar components that are bent or shaped around a desired viewpoint path. The cameras are then secured to the camera rigs and spaced along the length thereof. The cameras must also be individually aimed at the subject to provide a relatively precise orientation thereof. Such construction of the camera rigs along with the mounting, spacing, and aiming of the cameras thereon is very time consuming, difficult, and expensive.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes a camera mount and camera mounting system usable to construct an array of a plurality of cameras for capturing images from a plurality of viewpoints.

The camera mount comprises a body having a tab extending from a first end and a coupling flange extending from an opposite second end. The tab and coupling flange of adjacent camera mounts are pivotably coupleable by installation of a fastener therein. A spring washer or Belleville washer can be disposed on the fastener to provide a compressive force between the tab and coupling flange that resists movements in the joint. A top surface of the body is sized to receive a camera thereon and includes a pair of pins extending from the top surface against which a front face of the camera can be abutted to provide proper alignment of the camera relative to the camera mount. Opposing lateral faces of the body include pairs of parallel grooves extending between the top and bottom surfaces of the camera mount and forming a ridge therebetween. A terminal end of the ridge nearest to the bottom surface of the body is undercut to form a freely extending point. The camera is coupled to the camera mount by engaging an elastic member or loop with the point on one side of the body, stretching the loop over the camera, and engaging the loop with the point on the opposite side of the body.

A plurality of the camera mounts can be coupled together end-to-end and a respective camera disposed on each mount. The camera mounts are sized to minimize spacing between the cameras to minimize the distance between their respective viewpoints. The camera mounts are pivotable relative to one another about an axis defined by the fastener joining each mount to the next adjacent mount to enable the mounts to be aligned linearly or along an arc.

DESCRIPTION OF THE DRAWINGS

Illustrative embodiments of the invention are described in detail below with reference to the attached drawing figures, and wherein.

DETAILED DESCRIPTION

Figure 1:
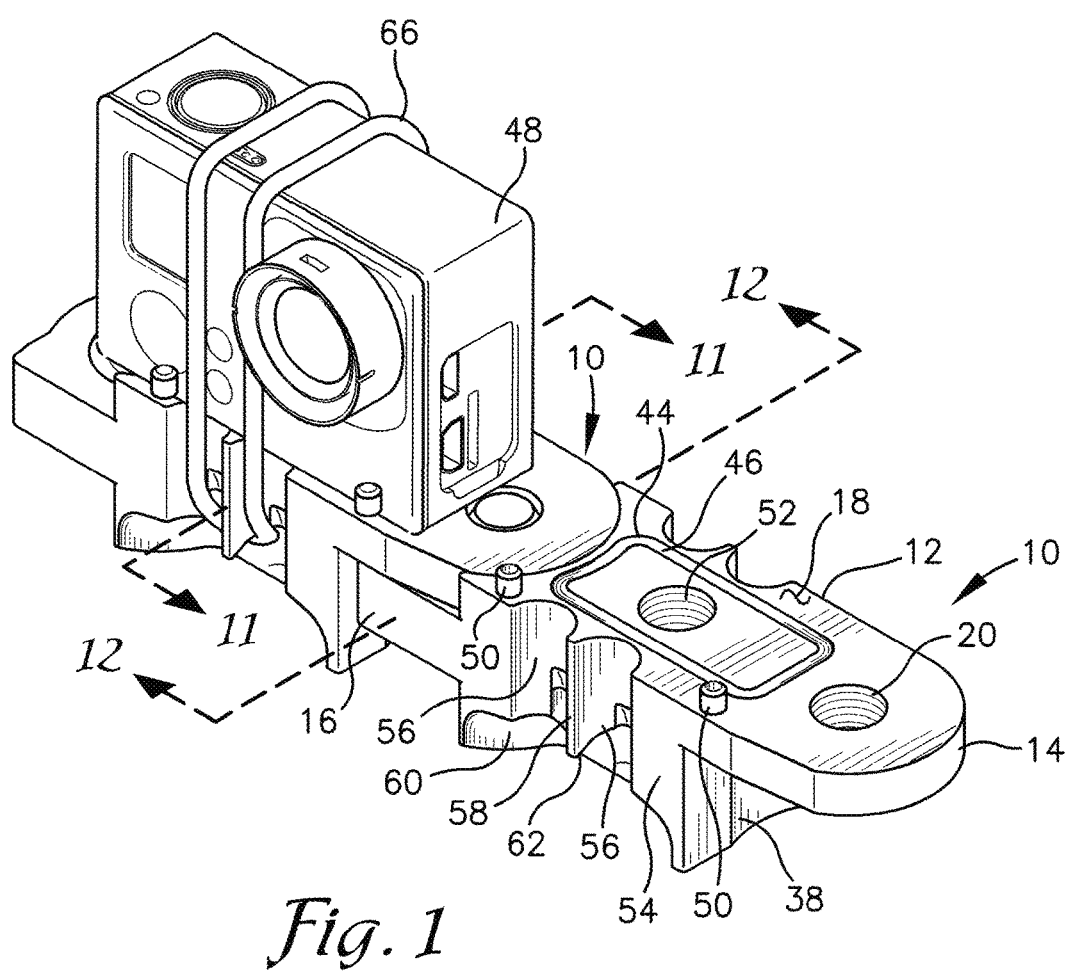
FIG. 1 is a perspective view of two camera mount links with a camera mounted on one of the links and depicted in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

With initial reference to FIGS. 1-8, a camera mount 10 is described in accordance with an embodiment of the invention. For simplicity, the camera mount 10 is described herein relative to the orientation depicted in FIGS. 1-2 and using terms such as top, bottom, horizontal, and vertical, among others, relative to the depicted orientation; such description is not intended to limit use or applications of the camera mount 10 to any particular orientation. FIGS. 1-8 depict a particular preferred form of the camera mount 10, but it is understood that the camera mount 10 can take other forms configured to provide the functionalities described herein without departing from the scope of embodiments of the invention.

The camera mount 10 comprises a generally rectangular cuboidal body 12 having a tab 14 extending from a first end and a coupling flange 16 extending from an opposite second end. The tab 14 has a thickness extending from a top surface 18 of the body 12 vertically downward so as to form a portion of and/or to extend the top surface 18 longitudinally beyond the first end of the body 12. The tab 14 includes a tab-bore 20 extending vertically through the thickness of the tab 14 and generally centrally positioned on the tab 14.

A distal end of the tab 14 has a rounded or arcuate profile. The opposite second end of the body 12 includes a cutout 22 with a mating rounded or arcuate profile configured to receive or accommodate the tab 14 of a second similarly configured and oriented camera mount 10. The cutout 22 includes a thickness approximately equal to the thickness of the tab 14.

The coupling flange 16 is spaced vertically downward from the top surface 18 of the body 12 by the cutout 22 a distance substantially equal to or greater than the thickness of the tab 14. The coupling flange 16 includes a flange-bore 24 extending vertically through the thickness of the flange 16 and positioned to align coaxially with the tab-bore 20 in the tab 14 of a second camera mount 10 when the tab 14 is positioned in the cutout 22 and to overlap the flange 16, as depicted in FIGS. 1, 2, and 12.

Figure 2:
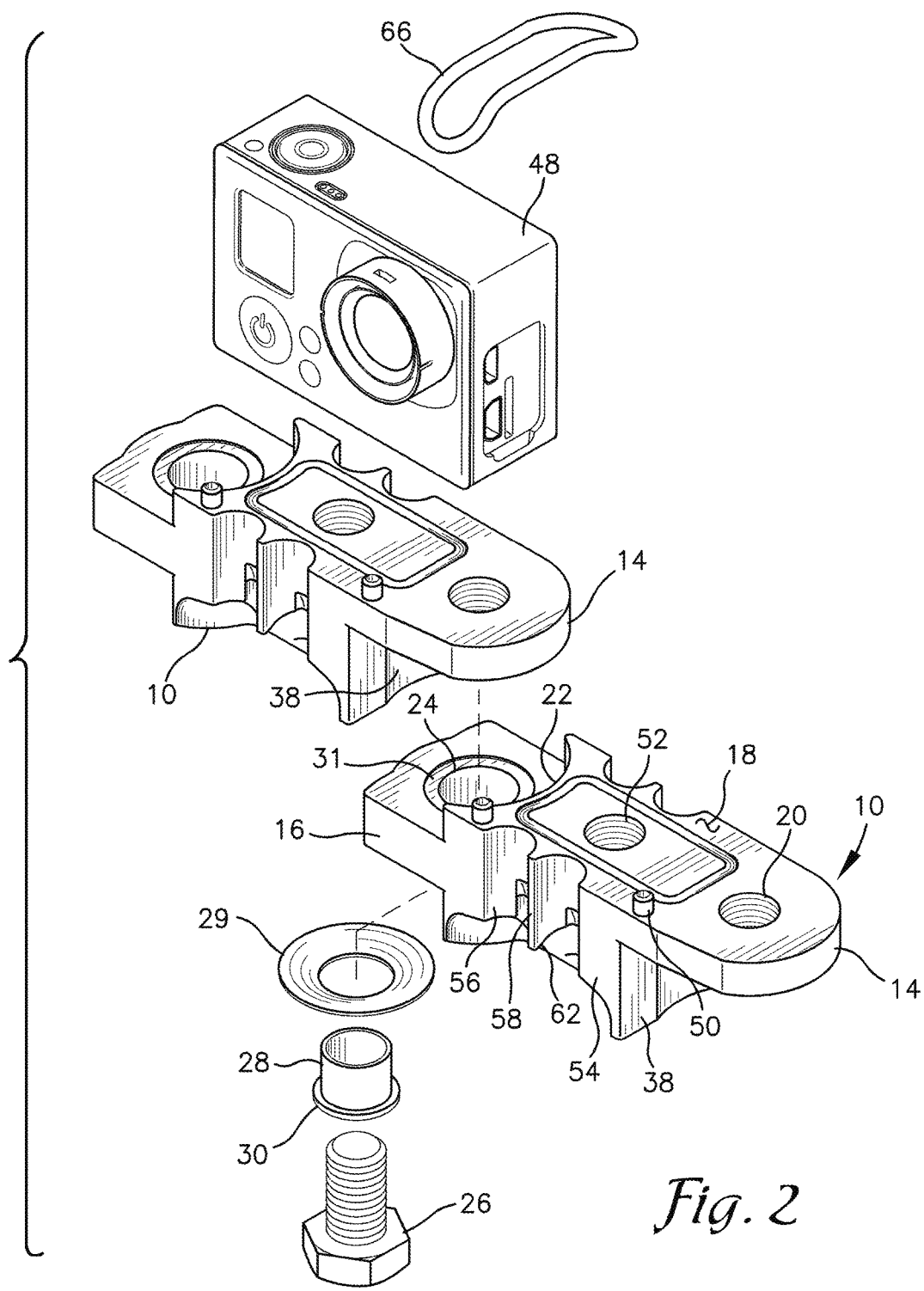
FIG. 2 is an exploded perspective view of the camera mount links of FIG. 1 in an unassembled state depicted in accordance with an embodiment of the invention.
Figure 12:
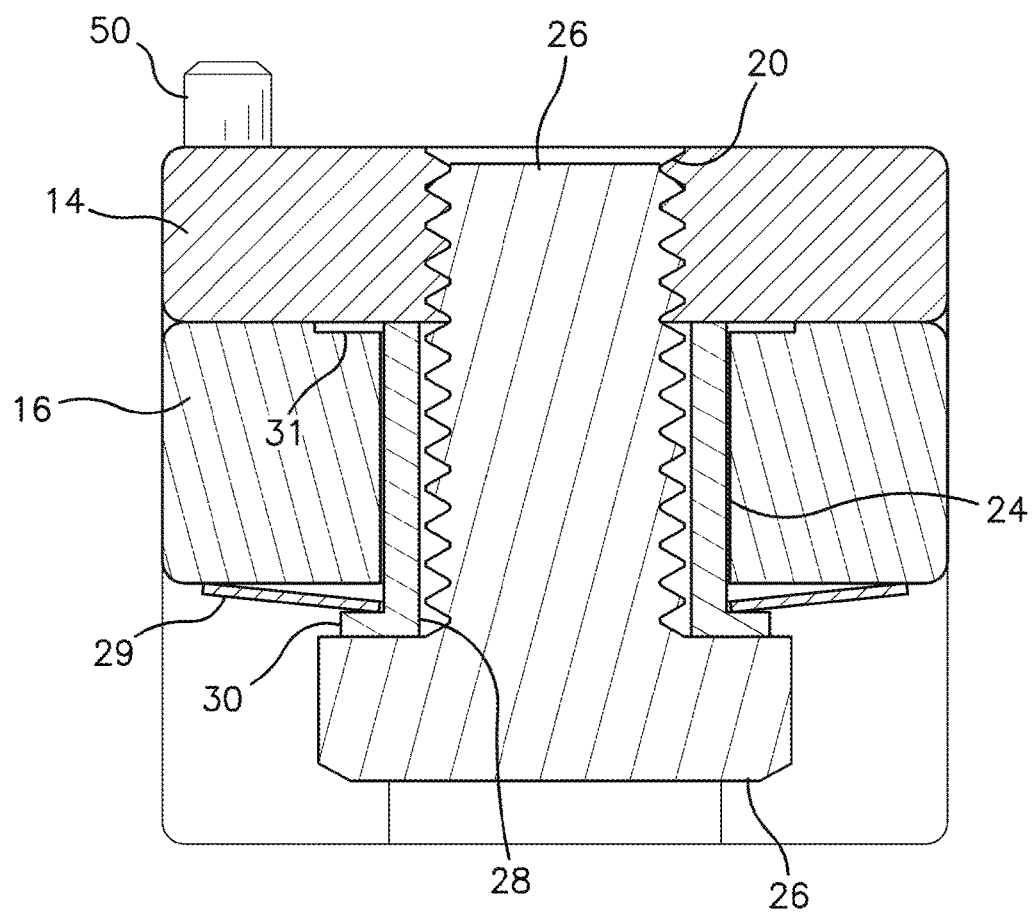
FIG. 12 is a partial cross-sectional view of the joint between the camera mount links of FIG. 1 taken along the line 12-12 depicted in accordance with an embodiment of the invention.

As depicted in FIGS. 2 and 12, the bores 20, 24 are configured to receive a fastener 26 therethrough to couple a pair of camera mounts 10 together. The tab-bore 20 may be threaded for threadable engagement with the fastener 26 while the flange-bore 24 may be sized to receive the fastener 26 therethrough without threadable engagement. The flange-bore 24 may be sized to receive a bushing 28, sleeve, or similar component between the wall of the flange-bore 24 and the fastener 26.

The bushing 28 may include an annular flange 30 extending radially outward from a bottom or first end thereof. The bushing 28 has an axial length that is greater than the thickness of the coupling flange 16. As such, when inserted into the bore 24 in the coupling flange 16 from beneath the coupling flange 16, a second end of the bushing 28 (opposite the first end) extends through the bore 24 and abuts a bottom surface of the tab 14 overlying the coupling flange 16. The first end of the bushing remains proud of the bottom surface of the coupling flange 16 with the annular flange 30 spaced apart from the coupling flange 16.

As depicted in FIG. 12, a spring washer 29 can be installed on the fastener and positioned between the annular flange 30 on the bushing 28 and the bottom surface of the coupling flange 16. The spring washer 29 comprises a generally frusto-conical shaped washer that is at least partially axially flexible so as to provide an axial spring force. The spring washer 29 can be engineered to provide a desired spring force. The spring washer 29 may comprise a spring washer that is available in the art and known as a Belleville washer or spring, a coned-disc spring, a conical spring washer, a disc spring, or a cupped spring washer, among other names.

A central aperture of the spring washer 29, through which the bushing 28 is inserted, is preferably dimensioned to provide a close-fit with the bushing 28. Similarly, the bushing 28 is preferably dimensioned to provide a close-fit with the fastener 26 and with the flange-bore 24. The spring washer 29 and bushing 28 are thus not allowed to substantially move relative to one another, the fastener 26, or the flange-bore 24. This configuration may also decrease an amount of relative movement or slop allowed between the tab 12 and the coupling flange 16 of the coupled camera mounts 10.

As depicted in FIG. 2, the fastener 26 comprises a hex-head bolt, but it is understood that the fastener 26 may comprise fasteners of a variety of other types and forms. Further, although the coupling between the camera mounts 10 is described as employing a threaded coupling, it is understood that a variety of alternative coupling mechanism might be employed without departing from the scope of embodiments described herein.

Figure 3:
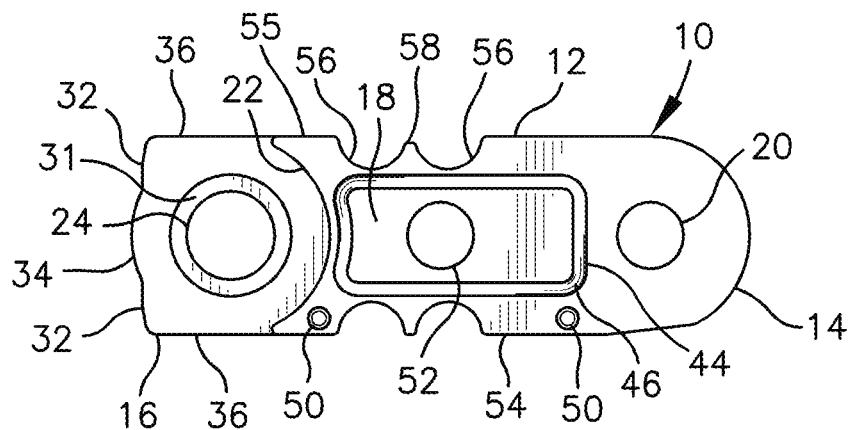
FIG. 3 is a top plan view of one of the camera mount links of FIG. 1.
Figure 4:
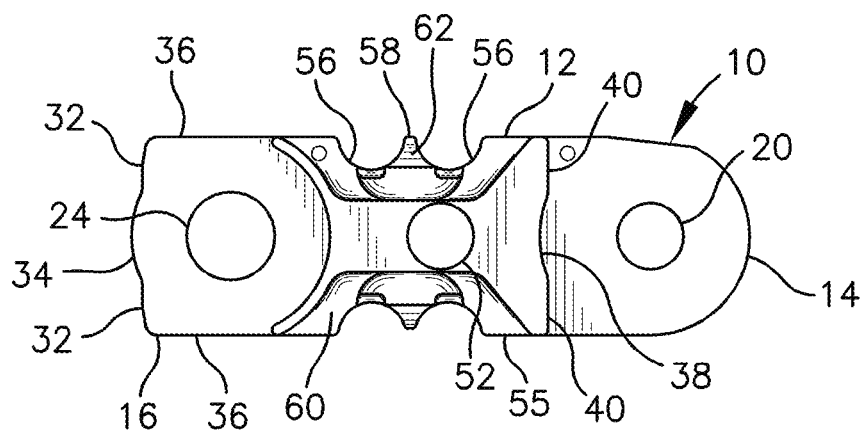
FIG. 4 is a bottom plan view of the camera mount link of FIG. 3.
Figure 5:
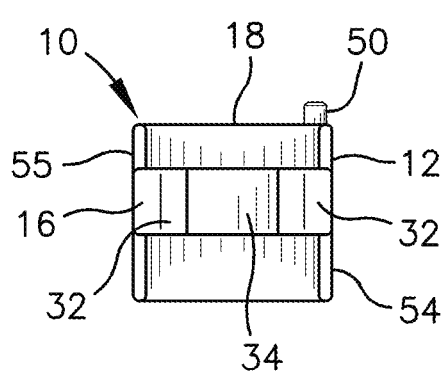
FIG. 5 is a first end elevational view of the camera mount link of FIG. 3.
Figure 6:
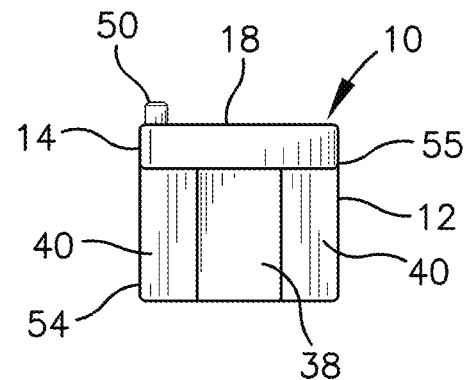
FIG. 6 is a second end elevational view of the camera mount link of FIG. 3.
Figure 7:
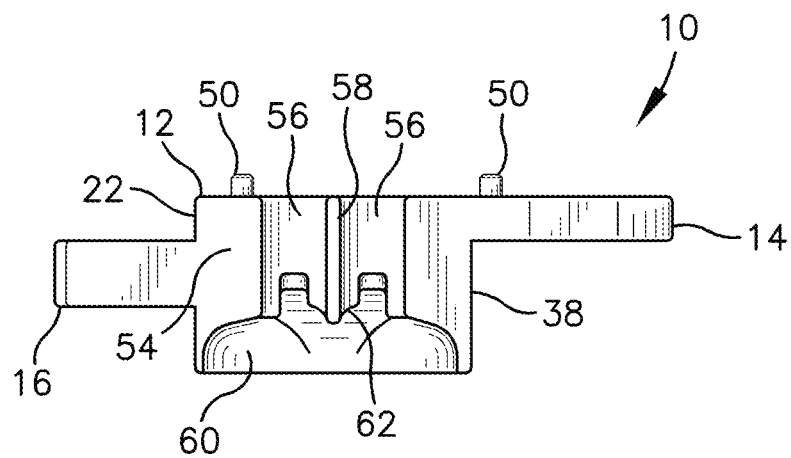
FIG. 7 is a first side elevational view of the camera mount link of FIG. 3.
Figure 8:
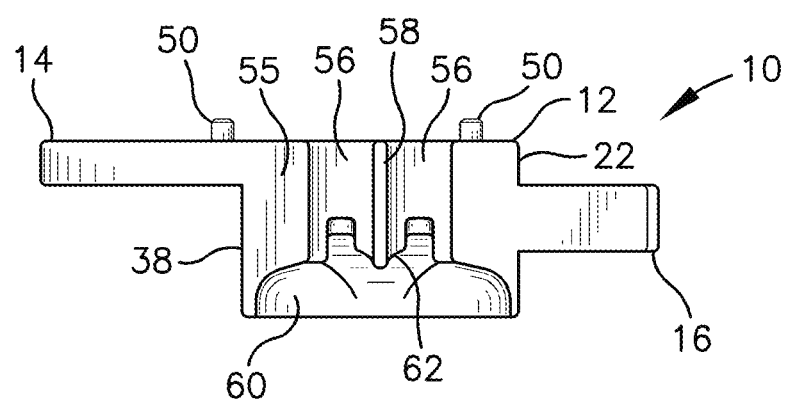
FIG. 8 is a second side elevational view of the camera mount link of FIG. 3.

As depicted in FIGS. 3 and 4, a distal end of the coupling flange 16 includes a generally blunt face formed with a pair of side portions 32 and a protuberance 34 therebetween. The side portions 32 extend from side edges 36 of the flange 16 to the protuberance 34 and are directed at a slight angle or along a slight arc such that the side portions 32 extend at least partially longitudinally away from the second end of the body 12 and toward the protuberance 34. The protuberance 34 includes a generally arcuate profile and is positioned centrally along the width of the flange 16. The profile formed by the side portions 32 and the protuberance 34 is substantially constant along the thickness of the flange 16.

As depicted in FIG. 4, the opposite first end of the body 12 beneath the tab 14 includes a receiving surface 38 having a profile configured to receive the protuberance 34. However, side portions 40 of the receiving surface 38 are substantially flat and are aligned to extend parallel to the width of the body 12. As such, when the coupling flange 16 and the tab 14 of a pair of camera mounts 10 are coupled together and are positioned in longitudinal alignment, small gaps 42 (FIG. 10) are present between the side portions 32 of the coupling flange 16 and the respective side portions 40 of the receiving surface 38 to enable pivotal movement of the camera mounts 10 relative to one another. Although a particular profile of the coupling flange 16 and the receiving surface 38 is described herein, it is understood that a variety of other profile configurations might be employed to provide the same or similar functions described herein without departing from the scope of embodiments of the invention.

The side portions 32 and 40 are configured to provide gaps 42 sufficient to enable approximately ten degrees of pivotal movement between the camera mounts 10 when coupled together, or to enable a plurality of the camera mounts 10 to be coupled together and arranged in a continuous circle having a diameter of approximately twenty-five inches or more. The side portions 32 and/or 40 can be otherwise configured to enable less or greater amounts of pivotal movement as desired.

With reference again to FIGS. 1-3, the top surface 18 of the body 12 includes a groove or channel 44 formed in the surface 18 with an o-ring or gasket 46 disposed therein. The gasket 46 is preferably comprised of resilient and/or elastomeric material and is dimensioned to fit within the channel 44 but to extend at least partially above the top surface 18 of the body 12. The gasket 46 provides frictional engagement and/or cushioning of a camera 48 disposed on the top surface 18, as depicted in FIG. 1. In another embodiment, the gasket 46 may be affixed to the top surface 18 directly and without use of the channel 44. Alternatively, a gasket or cushion could be attached to the bottom of the camera 48 or removably positioned between the top surface 18 and camera 48.

The top surface 18 also includes a pair of alignment features 50 such as, pins, tabs, stops, flanges, abutments or ridges, among other forms extending upward therefrom and positioned longitudinally spaced apart along and adjacent an edge of the top surface 18. In one embodiment, the alignment features 50 comprise roll pins disposed in corresponding apertures provided in the body 12. The alignment features 50 extend above the top surface 18 a distance sufficient to provide an abutment against which the camera 48 disposed on the top surface 18 may be engaged to permit precise positioning of the camera 48 relative to one or both sides of the camera mount 10.

Figure 9:
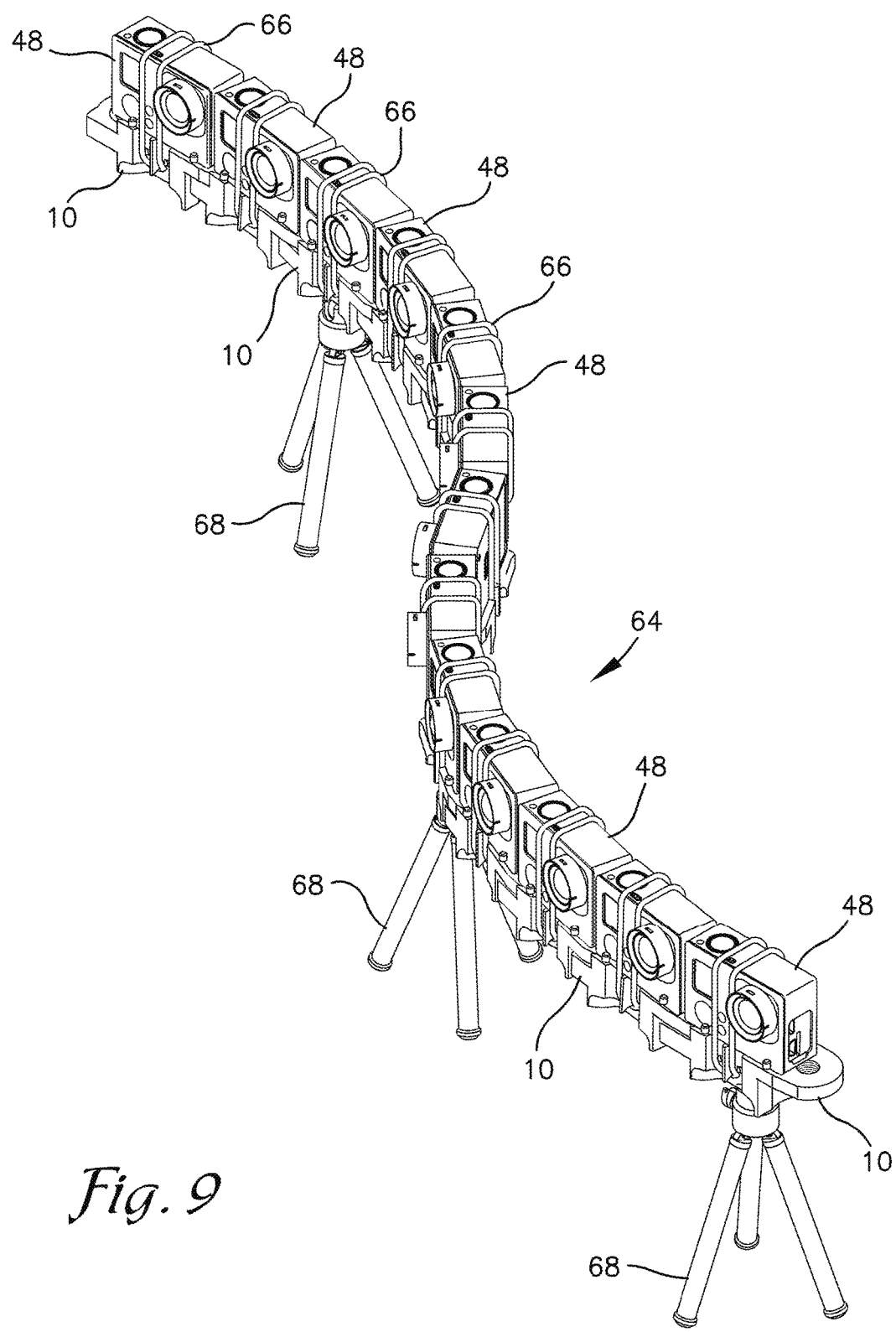
FIG. 9 is a perspective view of a plurality of the camera mount links of FIG. 1 with cameras mounted thereon and supported by tripods depicted in accordance with an embodiment of the invention.

A mounting receiver 52 may be provided in the body 12 and extending through the thickness thereof generally perpendicularly to the plane of the top surface 18. The mounting receiver 52 may be threaded and sized to couple the camera mount 10 to available camera support apparatus, such as a tripod 68 pedestal, stand, leg, or the like, as depicted in FIG. 9. The mounting receiver 52 might also be sized to couple to other forms of camera mounts or cameras.

First and second sides or side faces 54 and 55 of the body 12 are each provided with a pair of grooves 56 extending vertically downward from the top surface 18 and forming a ridge 58 therebetween. A recess 60 is formed in a bottom portion of each side face 54 and 55. The recess 60 intersects and at least partially undercuts the grooves 56 and the ridge 58 such that an end of the ridge 58 nearest to the bottom of the body 12 depends freely downward to form a catch 62, hook, tab, or similar protuberance configured to function as a retention element as described more fully below. It is understood that one of skill in the art will recognize other configurations of the camera mount 10 and/or the side faces 54, 55 that may be employed to achieve a similar function; such configurations are within the scope of embodiments of the invention described herein.

With reference now to FIGS. 1-10, assembly and use of the camera mount 10 is described in accordance with an embodiment of the invention. Any number of the camera mounts 10 can be coupled together and arranged as described herein. Each of the camera mounts 10 can carry a respective camera 48 or one or more of the camera mounts 10 may not include a camera 48 disposed thereon. A first camera mount 10 is coupled to a second camera mount 10 by placing the tab 14 of the first camera mount 10 on the coupling flange 16 of the second camera mount 10. A small amount of lubricant, such as a lithium grease, among lubricants, may be placed between the mating surfaces of the tab 14 and the coupling flange 16.

The spring washer 29 is disposed against the bottom surface of the coupling flange 16 with the apex of its frusto-conical shape being directed away from the coupling flange 16. The bushing 28 is installed through an aperture in the spring washer 29 and into the flange-bore 24. The annular flange 30 on the bushing 28 contacts the spring washer 29 and prevents passage of the bushing 28 through the aperture in the spring washer 29. The fastener 26 is next installed from beneath the coupling flange 16 through the bushing 28, the spring washer 29, and the flange-bore 24 and into threadable engagement with the tab-bore 20 in the tab 14. The fastener 26 is tightened to draw the bushing 28 toward the tab 14 until the second end of the bushing 28 (opposite the annular flange 30) contacts the bottom surface of the tab 14. The fastener 26 can be tightened to a predetermined torque or as desired. This process is repeated to couple each of the remaining camera mounts 10 of the plurality together as segments in a larger mount assembly 64 of a desired length.

Drawing of the bushing 28 toward the tab 14 at least partially compresses the spring washer 29 to preload or place the joint between the camera mounts 10 under a compressive force or load, e.g. the tab 14 and the coupling flange 16 are pressed against one another. The axial length of the bushing 28 maintains a gap between the annular flange 30 of the bushing 28 and the bottom surface of the coupling flange 16 when the fastener 26 is tightened. The spring washer 29 is thus not completely compressed and can at least partially flex within this gap to maintain a tension force on the fastener 26 and thus a compression force between the abutting faces of the tab 14 and the coupling flange 16. In another embodiment, the bushing 28 does not include the annular flange 30 and the spring washer 29 is compressed with the gap formed between the head of the fastener 26 and the coupling flange 16.

The compression force aids to resist pivotal movements between the camera mounts 10 about axes that are not coaxial with the fastener 26, e.g. movements that would result in bending of the mount assembly 64 upward or downward relative to the orientation depicted in FIG. 1. The compression force also aids to resist pivotal movement between the camera mounts 10 about an axis formed by the fastener 26 to the extent that the camera mounts 10 will generally maintain an angular orientation therebetween but the camera mounts 10 can still be pivoted by hand to achieve a desired angular orientation, as described more fully below. As such, the camera mounts 10 can be coupled together and subsequently arranged or positioned without need to adjust or tighten the fastener 26; the fastener 26 need not be tightened or loosened again unless it is desired to disassemble the mount assembly 64.

As depicted in FIGS. 2, 3, and 12, a top surface of the coupling flange 16 may be provided with an annular recess 31 disposed to circumscribe the flange-bore 24. The recess 31 may aid to reduce the surface area of the coupling flange 16 that is in contact with the bottom surface of the tab 14 and thus to concentrate the compression forces therebetween over a smaller surface area. Such may increase the resistance to relative movements between the camera mounts 10. It is understood, that the recess 31 might be disposed in the bottom surface of the tab 14 or take another form without departing from the scope of embodiments of the invention described herein.

Cameras 48 are disposed on the top surfaces 18 of each of the respective camera mounts 10. The front face of each camera 48 is abutted against the alignment features 50 to align the camera 48 along a first side 54 of the camera mount 10. Abutting of the camera 48 against the alignment features 50 provides a reliable alignment of the camera 48 relative to the camera mount 10 and may reduce the number of steps required during setup of the mount assembly 64 for capturing desired images/video. The gasket 46 contacts a bottom surface of the camera 48 to resist movement of the camera 48 relative to the body 12.

Figure 11:
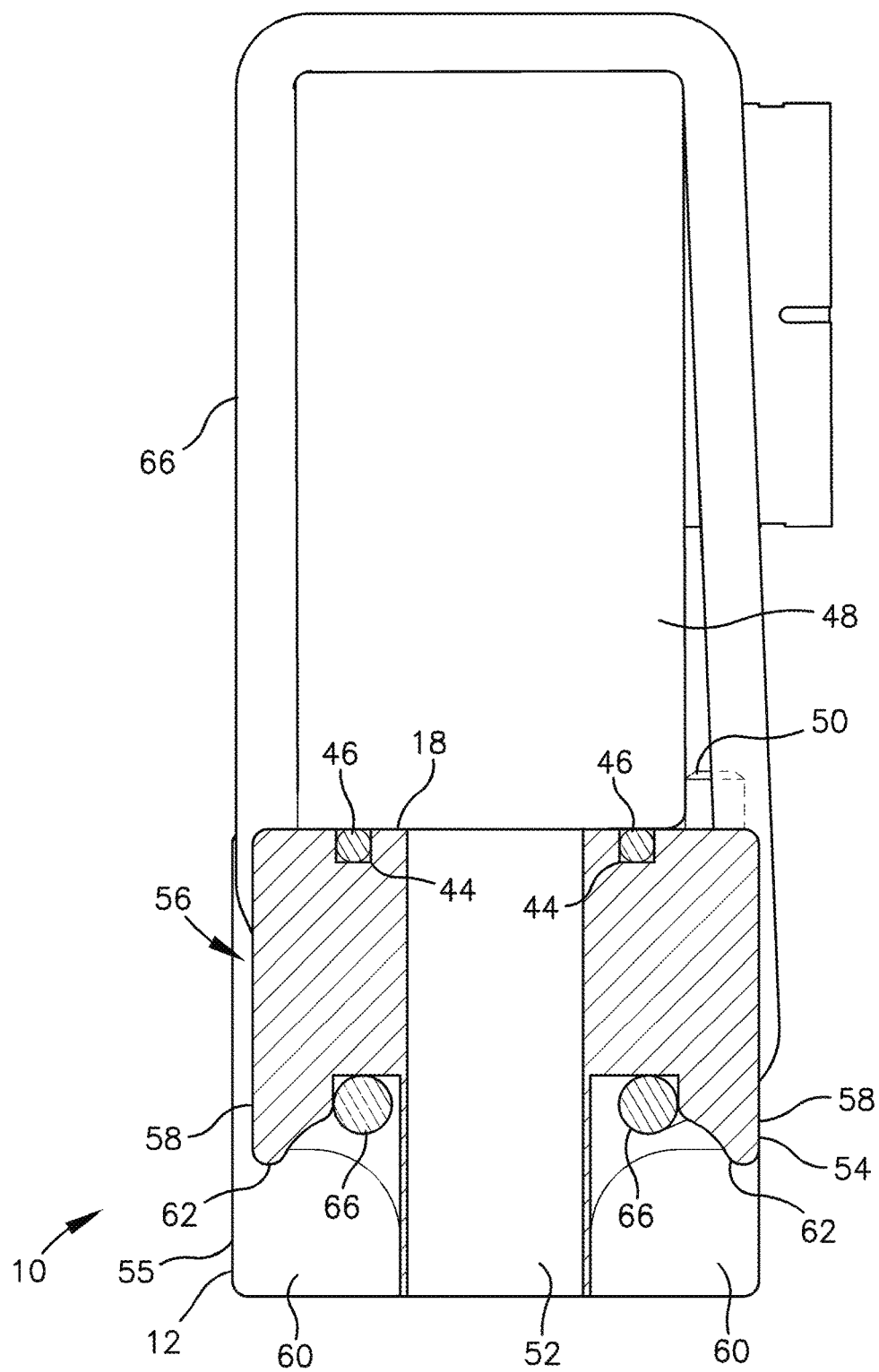
FIG. 11 is a cross-sectional view of the camera mount of FIG. 1 with the camera mounted thereon taken along the line 11-11.

With additional reference to FIG. 11, a retaining member 66, such as an elastic or resilient looped band, e.g. an o-ring or rubber band, is disposed in the recess 60 in one of the side faces 54 or 55 of the body 12 and stretched upward toward the top surface 18 to engage the retaining member 66 with the catch 62. The retaining member 66 is extended over the top of the camera 48 positioned on the top surface 18 of the camera mount 10 and is stretched into engagement with the catch 62 on the opposite side 54 or 55 of the body 12. The retaining member 66 is thus retained in tension with the camera 48 between the retaining member 66 and the top surface 18 of the body 12 and with a front of the camera 48 abutting the alignment features 50.

The catches 62 and grooves 56 are configured so that the retaining member 66 tends to pull the camera 48 against the alignment features 50 when stretched between the catches 62 on the first and second side faces 54, 55. As best shown in FIGS. 3, 4, and 11 in one embodiment, the ridge 58 in the first side face 54 is substantially even with the surface of the first side face 54. The ridge 58 in the opposite second side face 55 is slightly recessed from the plane of the side face 55 and the camera 48 partially overhangs the grooves 56 in the side face 55. The retaining member 66 thus at least partially wraps around a bottom edge of the camera 48 and is angled inward toward the second side face 55 of the camera mount 10 to engage the catch 62. This orientation may aid to apply a force on the camera 48 directed toward the first face 54 and thus to retain the camera 48 in contact or abutment with the alignment features 50.

The grooves 56 on the first face 54 of the camera mount 10 may also or alternatively be configured to cause the retaining member 66 to apply a force on the camera 48 directing the camera 48 into engagement with the alignment features 50. The apex of the grooves 56 at their greatest depth into the first face 54 may be positioned closer to the first face 54 than the surface of the alignment features 50 that is contacted by the camera 48. As such, the retaining member 66 may be slightly spaced away from the front face of the camera 48 as the retaining member 66 extends between the grooves 56 in the first face 54 and the top edge of the camera 48 as depicted in FIG. 11.

Although, the retaining member 66 is shown and described herein as comprising an elastic looped band that is engageable with the catches 62 formed in the sides faces 54 of the body 12, the retaining member 66 and the catches 62 may take other forms without departing from the scope of embodiments of the invention. For example, the retaining member 66 may comprise a single length of material (rather than a loop) that couples to the side faces 54/55 of the body 12 via one or more fasteners, clips, snaps, buttons, catches, hook-and-loop fasteners, or the like. The retaining member 66 might also comprise a non-elastic member such as a wire, bracket, or similar component.

In another embodiment, the mounting receiver 52 may be employed to couple the camera 48 to the camera mount 10 using known apparatus. For example, the mounting receiver 52 may have dimensions matching that of common or standard camera mounting hardware, e.g. the mounting receiver 52 may be configured to receive a one-fourth or three-eighths inch diameter threaded coupling rod that is also coupleable to the camera 48 and/or includes one or more pivotable or adjustable joints, among other features.

The camera mounts 10 may be dimensioned to minimize the distance between the cameras 48 and/or between the capture lenses of the cameras 48 when disposed on the camera mounts 10. As such, the distance between the points of view of each of the cameras 48 can be minimized. This minimized spacing may enable smoother transitions between images captured by the cameras 48 when combined in series and/or may enhance slow-motion effects that can be created using the captured images, among other benefits. When greater spacing between the cameras 48 is desired, one or more of the camera mounts 10 may be employed without a camera 48 disposed thereon. In one embodiment, one or more camera mounts 10 with a larger longitudinal dimension might be employed to provide greater spacing between the cameras 48. In another embodiment, camera mounts 10 of various dimensions may be employed together or separately to accommodate cameras 48 of various types and sizes.

The cameras 48 can comprise an available camera including still-frame, video, digital, film, or other forms of camera. In one embodiment, the cameras 48 comprise cameras from the HERO line of cameras from GoPro, Inc. of San Mateo, Calif. The cameras 48 may be coupled to a control device, such as a computing device, through wired or wireless connections to control image capture operations of each of the cameras 48. The cameras 48 and their control and operation is known in the art and is beyond the scope of the description provided herein. Further discussion thereof is thus not provided herein.

The mount assembly 64 can be supported in a desired position by a variety of support devices 68, such as a tripod, monopod, pedestal, stand, or leg, among others, as depicted in FIG. 9. Structures such as walls, ledges, or the like can also function as a support device 68. In one embodiment, a frame or legs can be custom-built for supporting the mount assembly 64 on, for example, a vehicle or other object. The support devices 68 can couple to one or more of the camera mounts 10 in the assembly 64 via a threaded engagement with the mounting receiver 52 in the body 12. A support device 68 need not be coupled to directly support every camera mount 10 in the assembly 64; the coupling between adjacent camera mounts 10 is sufficiently rigid to support a plurality of the camera mounts 10 between adjacent support devices 68 or cantilevered from a support device 68, as depicted in FIG. 9. The assembly 64 of camera mounts 10 substantially resists bending or deflection out of a plane that is parallel to the top surface 18 of the mounts 10 when the couplings between the mounts 10 are sufficiently tight, e.g. the assembly 64 resists deflection downward due to gravity.

Figure 10:
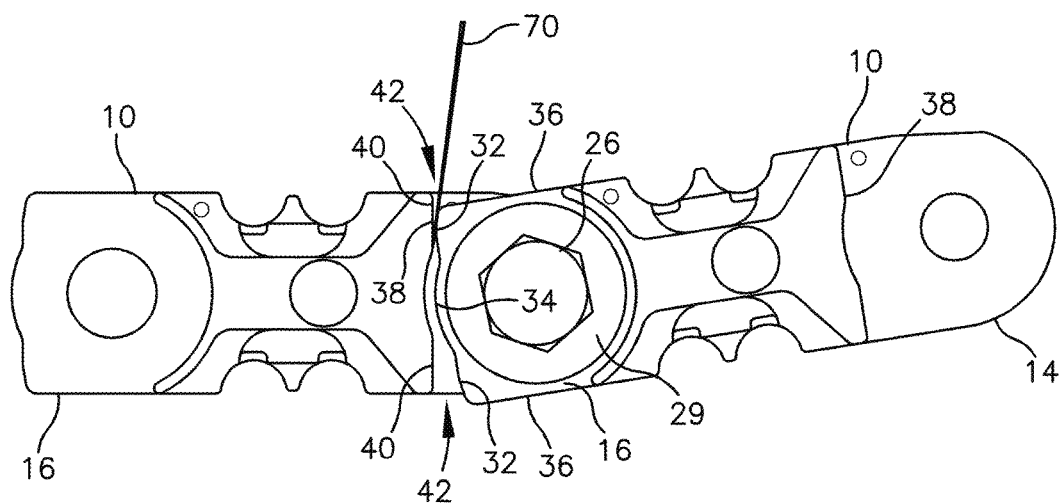
FIG. 10 is a bottom view of the camera mount links of FIG. 1 with a gauge disposed between opposing surfaces of the links to define a desired angular orientation of the links relative to one another depicted in accordance with an embodiment of the invention.

The camera mounts 10 can be pivoted within the plane, e.g. horizontally, relative to one another about axes formed through the fasteners 26 therebetween. As depicted in FIG. 10, the amount of pivotal movement between adjacent camera mounts 10 is defined by the size of the gaps 42 between the side portions 32 of the coupling flange 16 of one of the camera mounts 10 and the side portions 40 of the receiving surface 38 on an adjacent camera mount 10.

Shims or gauges 70 of known thicknesses can be employed to define or limit a desired angular orientation between adjacent camera mounts 70. As depicted in FIG. 10, the gauge 70 can be inserted into the gap 42 between the side portions 32 and 40 and the adjacent camera mounts 10 pivoted to close the gap 42 around the gauge 70, e.g. bring the side portions 32 and 40 into contact with the gauge 70. The camera mounts 10 can be pivoted by hand without need for any tools. As discussed previously, the forces provided by the spring washer 29 enable such pivotal movements without need to adjust the fastener 26 between the adjacent camera mounts 10 while also maintaining the desired angular orientation against unintended pivotal movements between the camera mounts 10. After obtaining the desired angular orientation the gauge 70 can be removed from the gap 42. In some instances it may be desired or beneficial to retain the gauges 70 within the gaps 42 in order to positively retain the desired orientation between the camera mounts 10, e.g. when the mount assembly 64 is being moved or subjected to bumping or jarring which may cause the orientations to be inadvertently changed.

In this manner the gauges 70 are inserted into the gaps 42 on the side of the mounts 10 forming an acute angle. Additionally or alternatively, the gauges 70 can be inserted into the gaps 42 on the opposite side of the mounts 10 forming an obtuse angle. Such can be employed to define the angular orientation between the mounts 10 or can aid to prevent the adjacent mounts 10 from moving away from a desired acute alignment toward a more obtuse alignment. This process can be repeated for each set of adjacent camera mounts 10 using gauges 70 of the same or different thicknesses installed into the gaps 42 on either side of the mounts 10 to provide a desired arc or arrangement to the mount assembly 64.

Thicknesses of the gauges 70 can be correlated relatively precisely to corresponding angular orientations between the camera mounts 10. A desired arrangement of the mount assembly 64 can thus be easily and quickly configured by selecting gauges 70 of appropriate thickness to provide a desired curve or arc. Additionally, because the cameras 48 are aligned with the camera mounts 10 by abutting against the alignment features 50, the cameras 48 are also properly aligned with the desired curve without need for additional alignment steps.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A camera mount comprising:
    a body having a first end, a second end opposite the first end, a first side, a second side opposite the first side, and a camera-support surface;
    a tab extending from the first end of the body;
    a coupling flange extending from the second end of the body, the coupling flange being coupleable to the tab of a similarly configured camera mount;
    a camera-retaining member that is disposable over the camera-support surface of the body to retain a camera on the camera-support surface;
    a first retention element on the first side that comprises a ridge extending along the first side away from the camera-support surface, an end of the ridge furthest from the camera-support surface being undercut to form a catch around which the camera-retaining member is engageable; and
    a second retention element on the second side, the camera-retaining member being engageable with the first retention element and the second retention element and is extendable between the first and second retention elements to extend over the camera-support surface of the body.

2. The camera mount of claim 1, further comprising:
    a camera disposed on the camera-support surface, the camera-retaining member being engaged with the first and second retention elements and extending over the camera to retain the camera against the camera-support surface.

3. The camera mount of claim 1, wherein the ridge is flanked on each side by a groove extending parallel to the ridge, the grooves at least partially receiving a portion of the camera-retaining member when engaged between the first retention member and the second retention member.

4. The camera mount of claim 1, further comprising:
    an alignment feature extending from the camera-support surface and adjacent an edge thereof, the alignment feature being configured to receive a surface of a camera placed on the camera-support surface in abutment therewith, the alignment feature providing alignment of the camera with the body.

5. The camera mount of claim 1, further comprising:
    a gasket disposed on the camera-support surface of the body, the gasket providing frictional engagement between the body and a camera disposed on the camera-support surface.

6. The camera mount of claim 1, wherein the tab includes a tab-bore and the coupling flange includes a flange-bore extending through their respective thicknesses, the tab-bore being alignable coaxially with the flange-bore of another similarly configured camera mount for insertion of a fastener therethrough, the tab of the camera mount and the coupling flange of the similarly configured camera mount being pivotably coupled via the fastener.

7. The camera mount of claim 6, further comprising:
    a spring washer disposed between a head of the fastener and the coupling flange, the spring washer providing a compressive force between the tab and the coupling flange.

8. The camera mount of claim 7, further comprising:
    a bushing having an axial length that is greater than a thickness of the coupling flange, the bushing being disposed within the flange-bore with a first end abutting the tab and an opposite second end extending from the flange-bore and abutting the head of the fastener to form a space between the head of the fastener and the coupling flange, the spring washer being disposed and at least partially compressed within the space.

9. The camera mount of claim 1, wherein the coupling flange includes a distal end that forms a first face and a portion of the first end of the body adjacent the tab includes a receiving surface with a profile that includes a second face, wherein a gap is formed between the first face of the coupling flange of the camera mount and the second face of the receiving surface of a second similarly configured camera mount that is coupled to the camera mount, and wherein a gauge is inserted in the gap with the first face and the second face contacting opposite sides of the gauge, the gauge limiting an angular orientation between the camera mount and the second camera mount.

10. A camera system, comprising:
    one or more cameras; and
    a camera mount, comprising:
        a plurality of segments including a first segment and a second segment, each segment of the plurality of segments having a substantially rigid body with a first end, a second end opposite the first end, a first side, a second side opposite the first side, and a camera-support surface, a first retention element on the first side, a second retention element on the second side, and including:
- a tab extending from the first end of the body and including a tab-bore,
- a coupling flange extending from the second end of the body, the coupling flange including a flange-bore, the tab of the first segment overlapping with the coupling flange of the second segment to align the tab-bore with the flange-bore, and
- a camera-retaining member that is extendable over the camera-support surface of the body being extendable between the first retention element and the second retention element and over the camera-support surface of the body; and
- a fastener installed in the tab-bore and the flange-bore and coupling the first and second segments, the first and second segments being pivotable relative to one another in a plane that is perpendicular to an axis formed by the fastener;

each of the cameras being disposed on the camera-support surface of a respective one of the segments, the camera-retaining member of the respective segment being extended between the first and second retention elements and over the camera to retain the camera against the camera-support surface of the respective segment.

11. The camera system of claim 10, wherein a gap is formed between a distal end of the coupling flange of the first segment and a receiving surface on the body of the second segment, and wherein a gauge of a known thickness is inserted into the gap to define an angular orientation between first and second segments.

12. The camera system of claim 10, further comprising:
an alignment feature extending from the camera-support surface of the body of each segment, the alignment feature providing an abutment against which a surface of a camera of the one or more cameras disposed on the camera-support surface is disposed to align the camera with the segment.

13. A camera mount to which a camera may be secured, the camera mount comprising:
- a body having a first end, a second end opposite the first end, a first side, a second side opposite the first side, and a camera-support surface;
- a tab extending from the first end of the body;
- a coupling flange extending from the second end of the body, the coupling flange being coupleable to the tab of a similarly configured camera mount;
- a first catch on the first side of the body and projecting downward and away from the camera-support surface;
- a second catch on the second side of the body and projecting downward and away from the camera-support surface; and
- a camera-retaining member that is engageable with the first catch and the second catch and is extendable between the first and second catches and over a camera supported on the camera-support surface of the body.

14. The camera mount of claim 13, wherein the retaining member comprises an elastic band.

15. The camera mount of claim 13, wherein at least one abutment projects upward from the camera-support surface proximate the first side thereof.

16. The camera mount of claim 13, wherein the first catch comprises a lower end of a first ridge formed in the first side of the body that extends perpendicularly to the camera-support surface, and the second catch comprises a lower end of a second ridge formed in the second side of the body and extending perpendicularly to the camera-support surface.

17. The camera mount of claim 16, wherein the first and second ridges are flanked on each side by a groove formed in the body and extending parallel to the respective first and second ridge, the grooves at least partially receiving a portion of the camera-retaining member when engaged between the first and second catches.

* * * * *